July 19, 1966 C. W. COBLENTZ 3,261,383
ICE CUTTING MACHINE

Filed Jan. 18, 1965 6 Sheets-Sheet 1

INVENTOR
CHARLES W. COBLENTZ
BY Semmes & Semmes
ATTORNEYS

July 19, 1966  C. W. COBLENTZ  3,261,383
ICE CUTTING MACHINE

Filed Jan. 18, 1965  6 Sheets-Sheet 3

INVENTOR
CHARLES W. COBLENTZ
BY Semmes & Semmes
ATTORNEYS

July 19, 1966

C. W. COBLENTZ 3,261,383

ICE CUTTING MACHINE

Filed Jan. 18, 1965

INVENTOR
CHARLES W. COBLENTZ

BY Semmes & Semmes

ATTORNEYS

July 19, 1966  C. W. COBLENTZ  3,261,383
ICE CUTTING MACHINE
Filed Jan. 18, 1965  6 Sheets-Sheet 5
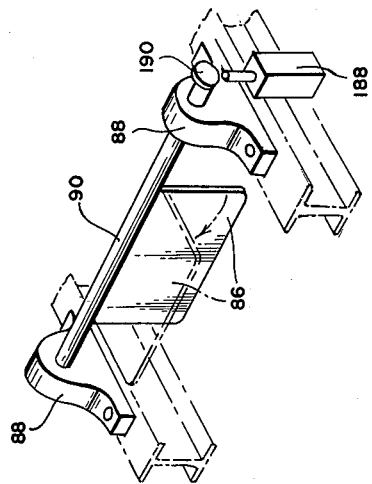
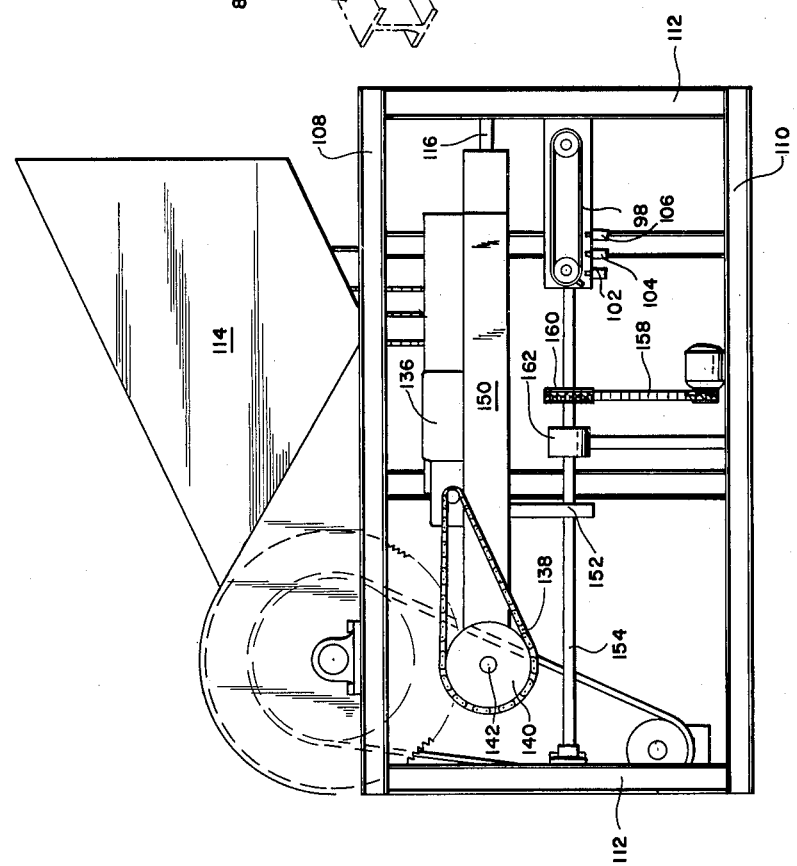
INVENTOR
CHARLES W. COBLENTZ
BY Semmes & Semmes
ATTORNEYS INVENTOR
CHARLES W. COBLENTZ
BY Semmes & Semmes
ATTORNEYS

United States Patent Office 3,261,383
Patented July 19, 1966

1

3,261,383
ICE CUTTING MACHINE
Charles W. Coblentz, Alexandria, Va., assignor to Mutual Ice Company, Alexandria, Va., a corporation of Virginia
Filed Jan. 18, 1965, Ser. No. 426,118
7 Claims. (Cl. 143—38)

The present invention relates to ice cutting machines, particularly a machine for cutting 300 lb. ice blocks into smaller seized, 12½ lb. ice block sections.

In the contemporary ice industry, the paper-wrapped small-sized 12½ lb. ice block is enjoying increasing popularity. This is due not only to public needs for the smaller block, but also to increasingly stringent Health Department controls necessitating the wrapping of commercially sold ice. Numerous previous inventors have devised elaborate mechanical contrivances for cutting up large blocks of ice into smaller sections. These contrivances have included elaborate scoring devices, as well as a series of longitudinal and transverse cutting saws mounted in a single cutting plane and more often than not employing a single drive mechanism. Perhaps due to their complexity and expense of installation, none of these previous ice cutting devices have enjoyed commercial acceptance. Applicant has devised a mechanically simple ice cutting machine which utilizes the forces of gravity, together with separate yet coordinated chain drive feeding systems for advancing the ice in a cutting path through a first series of longitudinal cutting saws for cutting the ice block into longitudinal sections and a second series of transverse cutting saws for cutting each of the longitudinal sections of ice into a series of transverse sections. Intermediate the first and second series of cutting saws applicant employs a uniquely pivoted cradle which is pivoted from a point beneath the cutting path, then through the cutting path to a point above the second series of saws so as to feed the longitudinal sections of ice in single increments to the second series of transverse cutting saws. The chain drive in the inclined bed in front of the first series of cutting saws and the chain drive in the pivoted cradle are coordinated so as to operate sequentially. Also, a safety cut-off is employed in the event that the longitudinal ice sections should become jammed between the first and second series of cutting saws.

Accordingly, it is an object of invention to provide an ice cutting machine of simple, rugged construction for attacking a 300 lb. block of ice and dividing it into 12½ lb. sections.

Another object of invention is to provide in an ice cutting machine a pivoted cradle feeding mechanism.

Another object of invention is to provide in an ice cutting machine of the type employing a first series of longitudinal cutting saws and a second series of transverse cutting saws, independent yet coordinated chain drive mechanism for each of said cutting saws.

Yet, another object of invention is to provide an ice cutting machine which employs a pivoted feeding mechanism, a first series of longitudinal cutting saws, and a second series of transverse cutting saws and a pivoted feeding cradle intermediate said cutting saws.

Yet additional objects of invention will become apparent from the ensuing specification and attached drawings, wherein:

FIG. 5 is a side elevation showing the cradle pivoting mechanism;

2

Figure 7:
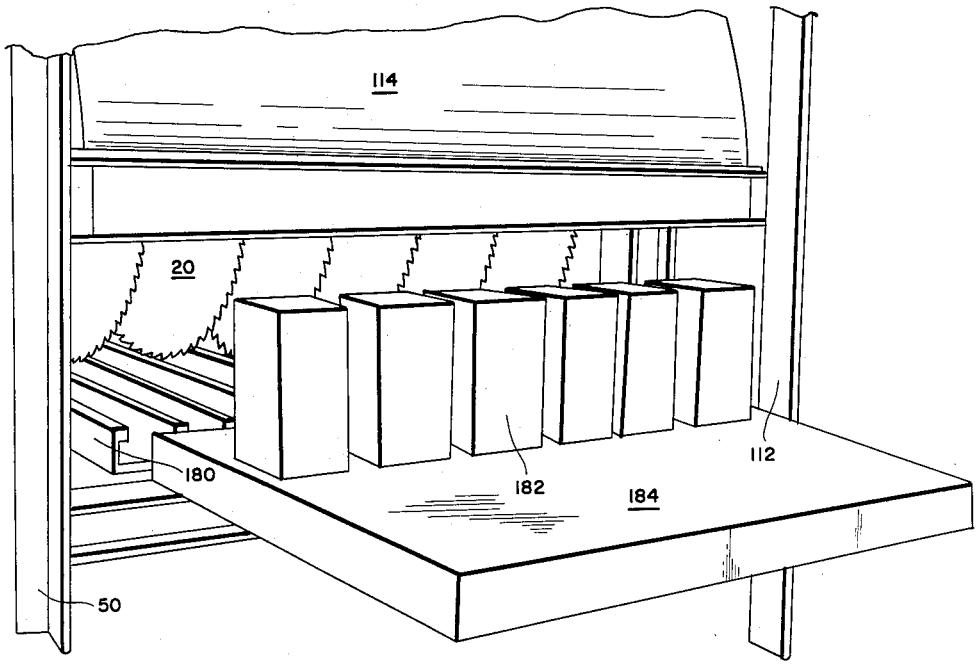
Figure 8:
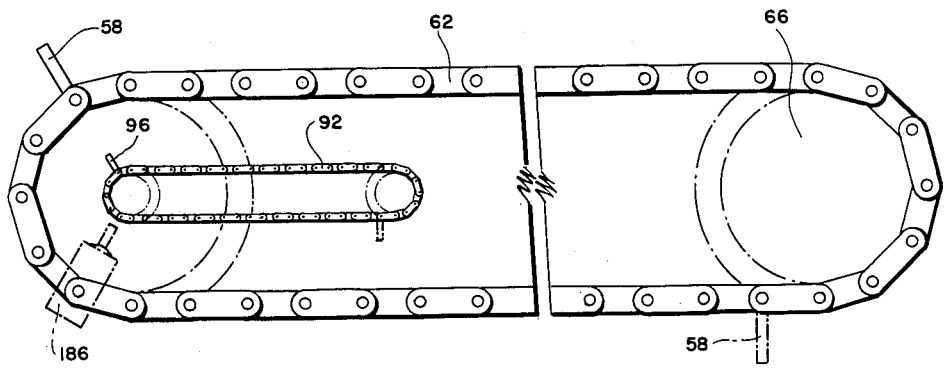

FIG. 6 is an enlarged perspective showing the safety flap stop mechanism;

FIG. 7 is a perspective view taken from the rear of the transverse cutting saws and showing the final product, 12½ lb. blocks of ice 182, being delivered from the transverse cutting saws 20; and FIG. 8 is a schematic of the timing chain 92 employed in connection with the inclined bed chain drive feeding mechanisms 60 and 62.

Figure 1:
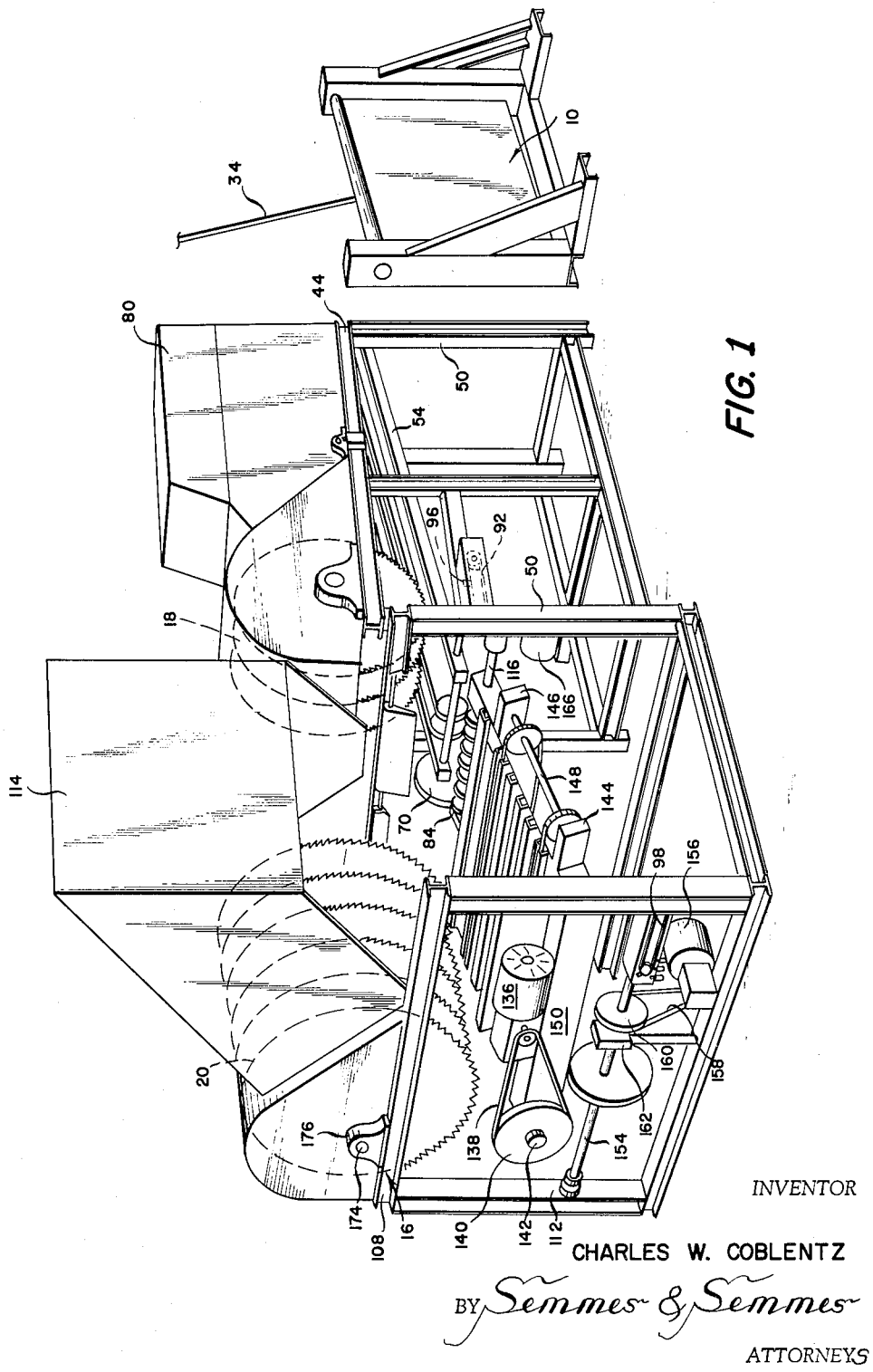
FIG. 1 is a perspective view of the ice block cutting machine, a 300 lb. block of ice being introduced to the cutting path by elevator 10 at the right hand side.

In FIG. 1 the ice cutting machine is shown as comprising pivoted feed ice block elevator 10, first longitudinal cutting table 12 and second transverse cutting table 16 with pivoted feeding cradle 14 positioned intermediate longitudinal cutting saws 18 and transverse cutting saws 20.

Figure 4:
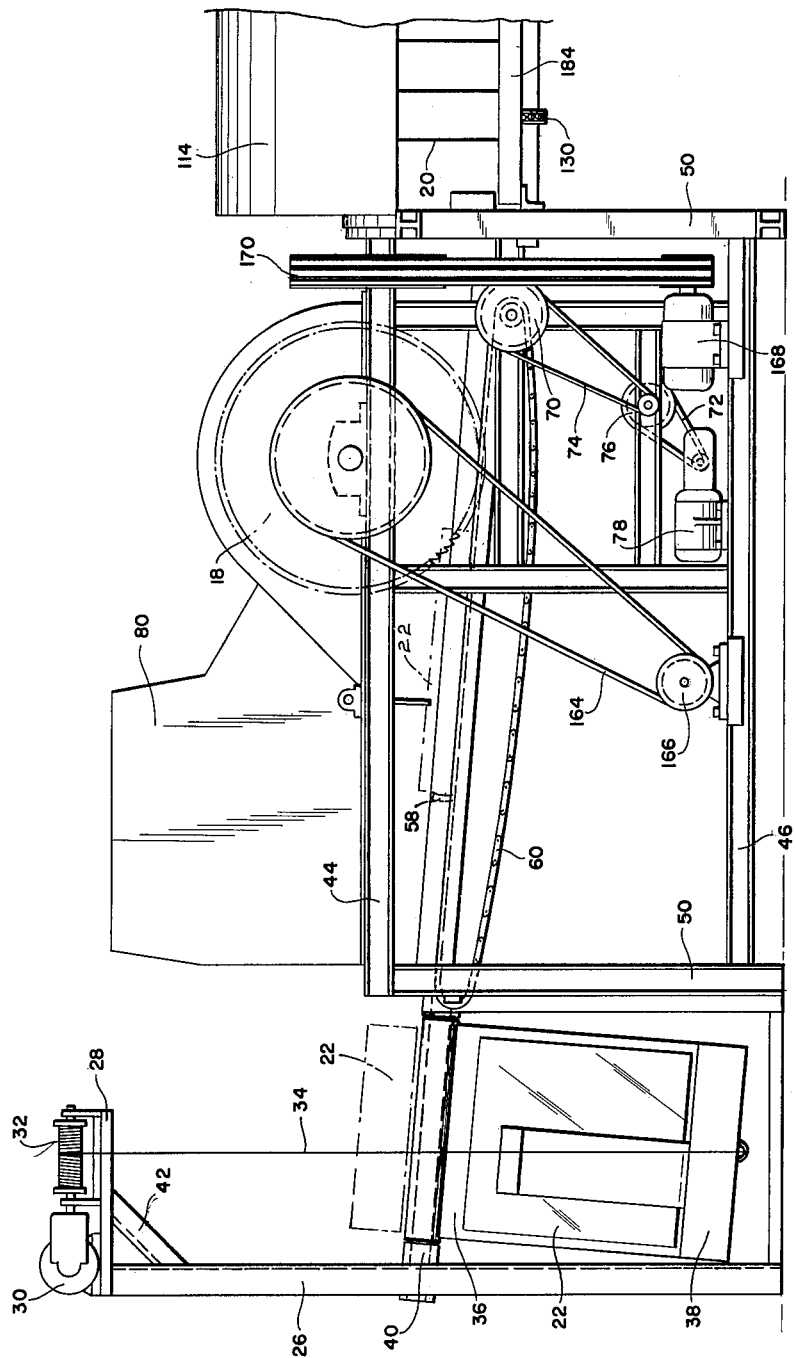
FIG. 4 is a fragmentary rear elevation.

A 300 lb. block of ice 22 is conveyed through the first series of longitudinal cutting saws 18 and the second series of transverse cutting saws 20 so as to be reduced to the smaller-sized 12½ lb. blocks 182 which are shown in FIG. 7. Blocks 182 may then be wrapped by conventional wrapping means. As illustrated in FIG. 4, 300-lb. ice block 22 is fed by an external delivery means (not illustrated) onto cradle 36 having foot portion 38 and pivoted upon rod 40 mounted in stand 26. A drive motor 30 may be supported upon platform 28 secured to stand 26 by means of strut or bracket 42. Pulley 32 driven by motor 30 winds cable 34 so as to pivot cradle 36 upwardly so that ice block 22 is gravity fed onto inclined tracks 52 and 54 which are supported within cutting table 16. Table 16 is further defined by upstanding legs 50, top horizontal support 44 and bottom horizontal support 46. Drive chains 60 and 62 are driven about sprockets 64 and 66 by drive motor 78 which drives belt 72 about first pulley 76, thence belt 74 about pulley or sprocket 70. Drive chains 60 and 62 may employ respectively lugs 56 and 58 which rearwardly engage block of ice 22, as illustrated phantom in FIG. 4. Lugs 56 and 58 together with gravity feed the ice block 22 through saws 18 for cutting into longitudinal sections. Longitudinal cutting saws 18 are mounted upon shaft 68 which is driven by motor 166 by means of belt 164. Hood 80 employing inwardly positioned heating elements 82 may be positioned above saws 18 so as to catch and melt the "snow" or minute particles of ice which are thrown by saws 18. As the 300-lb. block of ice is cut by the three saws 118 into four longitudinal sections of ice, drive chains 60 and 62 urge the longitudinal sections of ice over idler roller 94 and by means of roller bearings 84 onto pivoted cradle 14. A trap stop or safety flap 86, illustrated in FIG. 1 and more particularly in FIG. 6, may be supported between legs 50 by means of shaft 90 set in blocks 88. Shaft 90 may have at its outer end a lug 190 which engages microswitch 180 if the flap is pivoted upwardly by a longitudinal section of ice jammed between inclined bed 12 and the pivoted cradle 14. In this position the microswitch may relay a stop to cradle 14 pivoting motor 156, thereby preventing pivoting upwardly of the cradle bed when the ice is jammed. Similarly, microswitch 180 may be employed to stop activation of cradle 14 chain drive motor 136.

As illustrated schematically in FIG. 8, the drive chains 60 and 62 may be governed in their operation by a timing chain 92, having radially outwardly extending lug 96 which engages micro limit switch 186. Micro limit switch 186 may be connected to the cradle pivoting mechanism 156 as well as the cradle chain drive motor 136 so as to activate both motors upon completion of the longitudinal cutting cycle in first cutting bed 12. The pivoted cradle 14 and transverse cutting saws 20 are supported in a machine section defined by top I beams 108, bottom I beams 110 and upstanding angle iron or I beam supports 112. Hood 114 may be positioned above and rearwardly of saws 20 so as to catch the thrown "snow."

Figure 2:
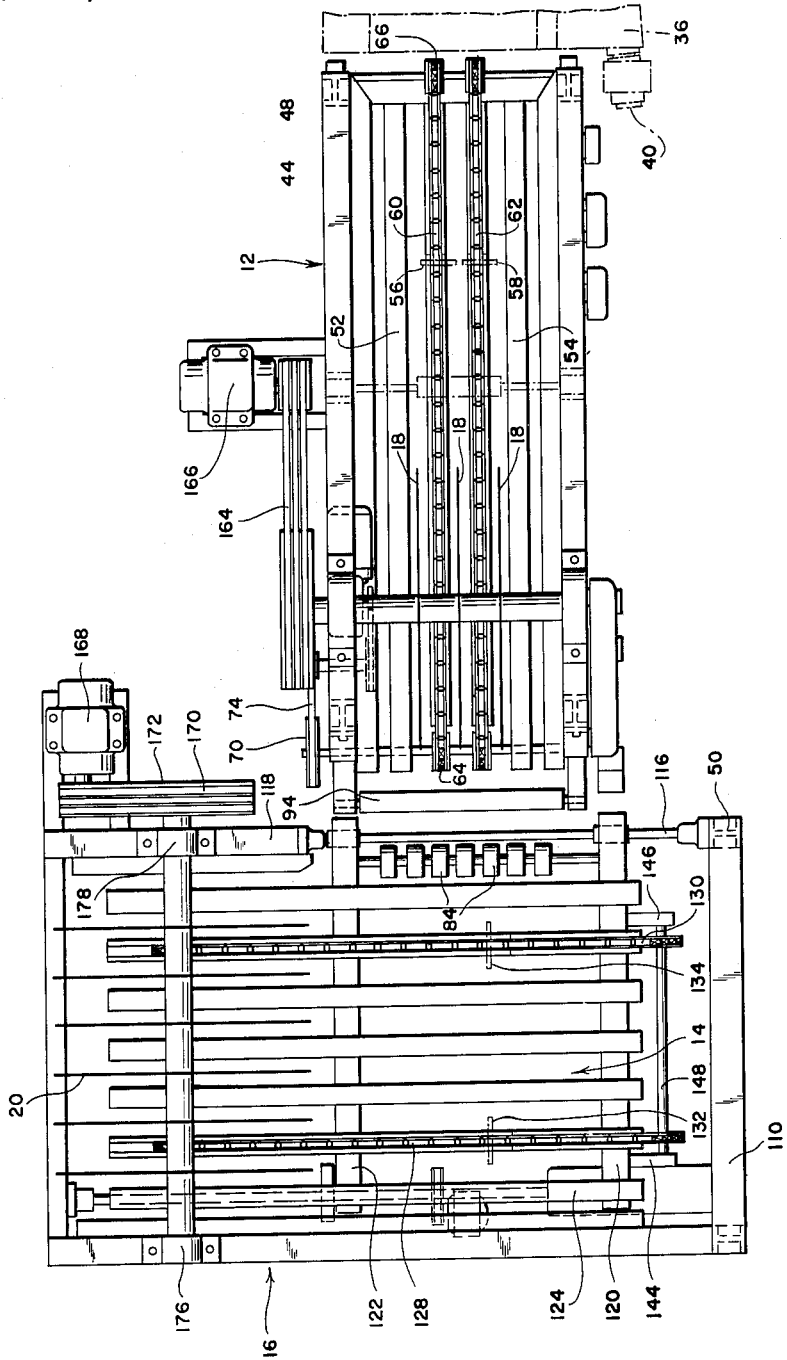
FIG. 2 is a top plan.
Figure 3:
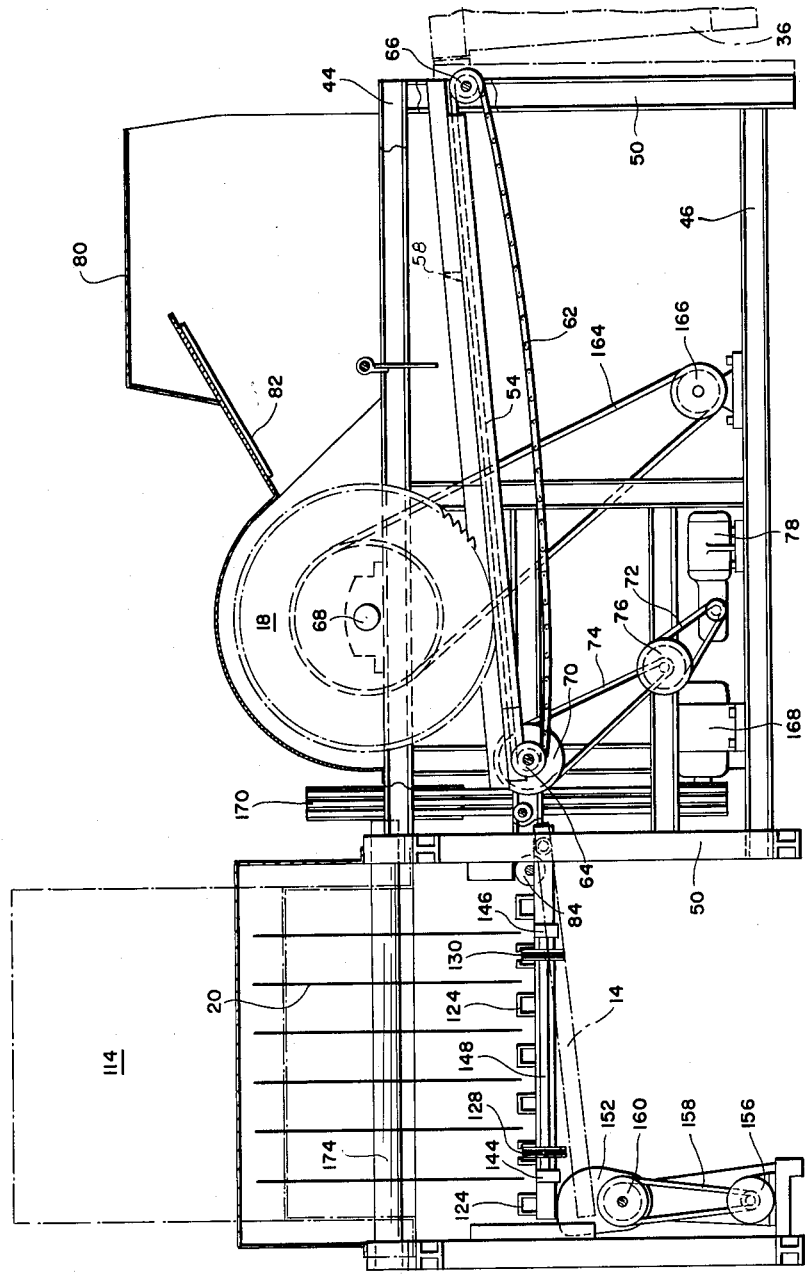
FIG. 3 is a front elevation, partially in section.

As illustrated in FIG. 2, a stanchion support 118 may extend rearwardly from leg 50 to support shaft 174 by means of brackets 176 and 178. Cradle 14 is defined by end elements 120 and 122 and support irons 124. Cradle drive chains 128 and 130 are driven by means of shaft 148 mounted in blocks 144 and 146, extending from front cradle member 120. The drive chains 128 and 130 employ respectively upstanding lugs 134 and 132, identical in function to the ice block engaging lugs 56 and 58 in the inclined bed drive chains 60 and 62. As many as four sets of lugs 132 and 134 may be fixed to drive chains 128 and 130 so as to advance separately the longitudinal sections of ice into saws 20 for transverse cutting. As illustrated in FIG. 5, drive chains 128 and 130 are driven about shaft 142 and shaft 148 by means of chain 138 driven by motor 136.

As particularly illustrated in FIGS. 1 and 5, cradle bottom piece 150 is engaged by cradle pivoting cam 152 mounted upon shaft 154 supported between upstanding leg 112 and bearing block 162. Cam motor 156 driving chain 158 mounted upon sprocket 160 rotates shaft 154 and thus cam 152 so as to pivot the entire cradle mechanism 14 upwardly through the cutting path and to a point above said path and above cutting saws 20 so that there is a gravity feed as well as the feeding drive chains 128 and 130 into saws 20. A timing chain 98 may be mounted coaxially with chains 128 and 130 to serve a function similar to that of the timing chain 92 employed in the inclined bed. Chain 98 may have outstanding lug 100 for tripping micro limit switches 102, 104 and 106 so that the chains 128 and 130 are advanced together in sequential segments, insuring that four longitudinal sections of ice are fed in single increments into saws 20, thus producing on platform 184 final blocks 182, as illustrated in FIG. 7, in a series of increments cut transversely from a single longitudinal section of ice.

Saws 18, as illustrated in FIGS. 2 and 4, are driven by drive motor 166, and multiple belts 164 engaging multibelt pulley 172 mounted on shaft 174.

According to the present invention there is provided a continuous method of sectioning a 300-lb. block of ice without the necessity for intervention of human hands. There are separate, but synchronized drive mechanisms. The forces of gravity are employed with these drive mechanisms in feeding to both series of saws and there is a timing mechanism activating the feeding and pivoting mechanisms. Consequently, there is eliminated the necessity for conventional scoring prior to cutting or the elaborate mechanical structures devised to do the same cutting job. As a result four men can do the job of eight in cutting and packaging in 12½ lb. increments and the cost of such cutting is reduced approximately 50 percent.

Manifestly, various ice chain driving mechanisms may be employed, the steps of longitudinal and transverse cutting may be reversed and there may be substitution of mechanical parts without departing from the spirit and scope of invention, as defined in the subjoined claims.

I claim:
1. An ice block cutting machine comprising:
 (a) an upstanding frame defining an ice cutting path;
 (b) a first series of longitudinal cutting saws supported in said frame and intersecting said cutting path so as to cut said ice block into longitudinal sections;
 (c) a second series of transverse cutting saws supported in said frame apart from said first series and intersecting said cutting path so as to cut each of said longitudinal sections of ice into transverse sections;
 (d) an inclined bed, including an endless chain drive feeding mechanism, supported in said cutting path in front of said first series of longitudinal cutting saws;
 (e) an ice block elevator supported in front of said inclined bed and pivotable from a vertical position to a horizontal position in a plane substantially parallel with said inclined bed so as to gravity feed a block of ice onto said bed;
 (f) a pivoted feeding cradle supported intermediate said first series and said second series of saws, said cradle being pivotable from a point below said saws and through said cutting path to a point above said second series of saws so as to gravity feed sections of longitudinally cut ice for transverse cutting by said second series of saws, said cradle including a chain drive advancing each of said longitudinal sections of ice in increments as wide as each of said longitudinal sections.

2. An ice cutting machine as in claim 1, said chain drive in said inclined bed and said chain drive in said cradle being governed so as to operate sequentially of one another and including ice engaging means protruding outwardly of said chain drives.

3. An ice cutting machine as in claim 2, including a safety flap control pivoted behind said first series of longitudinal cutting saws and above said cutting path, said safety flap being connected to said cradle so as to prevent pivoting of said cradle, as a block of ice is jammed in said safety flap, pivoting said flap upwardly.

4. An ice cutting machine as in claim 3, including a heated hood means supported above said first series of saws.

5. An ice cutting machine as in claim 4, said cradle pivoting mechanism including a motor actuated cam supported in said frame beneath said cradle and pivoting upwardly said cradle as said longitudinal sections of ice are fed onto said cradle.

6. An ice cutting machine as in claim 5, including timing chains coaxially supported with at least one of said chain drives in said inclined bed and said chain drive in said pivoted cradle, and including means tripping said chain drive controls as a limit upon feeding of ice into said saws.

7. In an ice cutting machine of the type employing a first series of longitudinal cutting saws and a second series of transverse cutting saws for sectioning ice the combination of:
 (A) an inclined bed, including an ice block feeding mechanism, supported in front of said first series of cutting saws;
 (B) a pivoted feeding cradle supported intermediate said first series and said second series of cutting saws, said cradle being pivotable from a point beneath said second series of saws to a point above second series of saws so as to feed sections of longitudinally cut ice for transverse cutting; and
 (C) separate endless chain drive feeding mechanisms supported in said inclined bed and in said cradle, the chain drive in said cradle being timed to advance ice towards said second series of transverse cutting saws in increments as wide as the sections of longitudinally cut ice.

References Cited by the Examiner
UNITED STATES PATENTS

| | | | |
|---|---|---|---|
| 1,507,004 | 9/1924 | Schraishuhn | 125—13 |
| 1,553,257 | 9/1925 | Miller | 125—13 |
| 1,813,149 | 7/1931 | Daugherty | 125—13 |
| 1,866,883 | 7/1932 | Everett | 125—13 |
| 1,997,620 | 5/1935 | Zeigler | 143—48 X |
| 2,080,452 | 5/1937 | Zeigler | 143—38 X |
| 2,169,133 | 8/1939 | Barr | 143—38 |

WILLIAM W. DYER, JR., *Primary Examiner.*

J. M. MEISTER, *Assistant Examiner.*